United States Patent [19]
Iovine

[11] Patent Number: 4,964,684
[45] Date of Patent: Oct. 23, 1990

[54] HOLOGRAPHIC IMAGE RECORDING USING LIQUID CRYSTAL

[76] Inventor: John Iovine, 86-03 102 St., Richmond Hill, N.Y. 11418

[21] Appl. No.: 291,113

[22] Filed: Dec. 28, 1988

[51] Int. Cl.$^5$ .................. G03H 1/30; G03H 1/26
[52] U.S. Cl. ..................... 350/3.76; 350/3.78
[58] Field of Search .............. 350/3.76, 3.78, 3.6

[56] References Cited

U.S. PATENT DOCUMENTS

| | | | |
|---|---|---|---|
| 4,206,965 | 6/1980 | McGrew | 350/3.66 |
| 4,411,489 | 10/1983 | McGrew | 350/3.76 |
| 4,422,732 | 12/1983 | Ditzik | 350/96.29 |
| 4,672,457 | 6/1987 | Hyatt | 358/231 |
| 4,778,262 | 10/1988 | Haines | 350/3.76 |
| 4,878,717 | 11/1989 | Gerritsen | 350/3.76 |

FOREIGN PATENT DOCUMENTS 0240227 10/1987 European Pat. Off. .......... 350/3.76

Primary Examiner—Bruce Y. Arnold
Assistant Examiner—Terry S. Callaghan

[57] ABSTRACT

This invention pertains to holography and particularly to a novel method for producing holographic stereogram images from a sequential series of two dimensional images generated on a liquid crystal display matrix. Further a liquid crystal display matrix is used to generate a vertical slit aperture for the masking of a holographic plate.

1 Claim, 3 Drawing Sheets

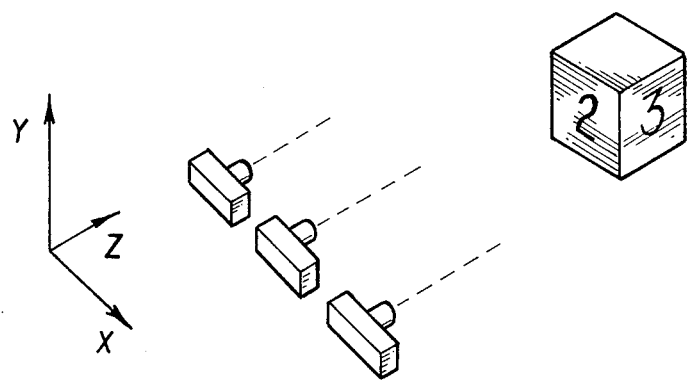
FIG. 1
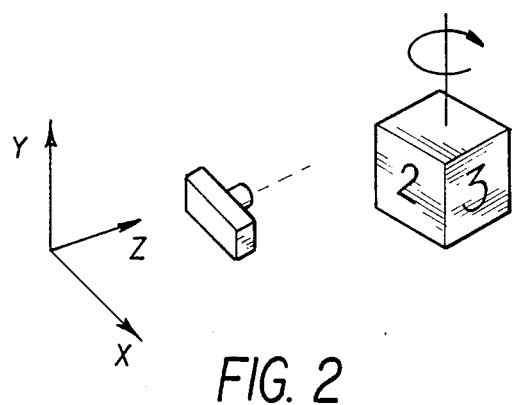
FIG. 2
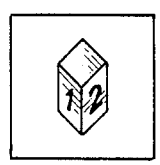 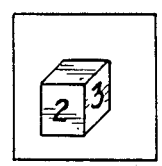 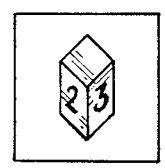
FIG. 3A   FIG. 3B   FIG. 3C

HOLOGRAPHIC IMAGE RECORDING USING LIQUID CRYSTAL

BACKGROUND OF THE INVENTION

1. Field of Invention

This invention related to holography, and particularly to a novel method for producing holographic stereogram images from a sequential series of two dimensional images generated on an Liquid Crystal Display (LCD) matrix.

2. Prior Art

In order to provide background information so that the invention may be completely understood and appreciated in its proper context, reference is made to a number of prior art patents and publications as follows:

Benton U.S. Pat. No. 4,445,749 "Holographic Products and Processes".

An article by D. J. DeBitetto entitled Holographic Panoramic Stereograms Synthesized from White Light Recording, appearing on pages 1740 and 1741 of Applied Optics, Volume 8, No. 8 Aug. 1969.

An article by S. A. Benton, D. A. Duston-Roberge and R. Simard entitled "Achromatic holographic stereogram of Landsat Multispectral scanner data." Appearing on pages 338, 339 and 340 of Optical Engineering Vol. 24, No. 2, Mar.-Apr. 1985.

An article by King, Noll, and Berry, entitled "A New Approach to Computer Generated Holography published in Applied Optics pages 471-475. Vol. 9, No. 2 Feb. 1970.

The basic process of generating holographic stereograms is described by Benton U.S. Pat. No. 4,445,749, I quote "beginning with the step of recording a series of two dimensional photographs of three dimensional subject taken from a series of equally spaced positions along a horizontal line. Images from these photographs are subsequently projected on a translucent screen. As each of the series of images is projected, it is holographically recorded on a region of a stationary photographic plate exposed by a horizontally movable vertical slit aperture, such that the images are recorded as a sequence of vertical strips on the photographic plate. Upon illumination of the strip hologram so produced with monochromatic light, a three-dimensional image is produced that has horizontal parallax but not vertical parallax."

Whatever the precise merits, features and advantages of the above cited references, none of them achieves or fulfills the purpose of the present invention.

Two major problems are encountered when making stereograhic holograms using transparent film, specifically vibration and image registration.

Vibration when recording a hologram prevents the hologram from being recorded properly, thereby making the image useless. Improper registration of images would also make the subsequent stereographic hologram useless. Vibration is caused by the equipment that sequentially steps the transparent film images. And precise registration of the images along its vertical and horizonal axis such that one image is in proper register with the next and so forth for all the images required is a tedious procedure.

The Vertal slit aperture that moves horizontally so that the images are recorded as a sequence of vertical holographic strip images is still another cause vibration and alignment problems. In some systems, the aperture remains fixed while the holographic plate behind it moves, in either system vibration is generated.

Vibration is currently handled by allowing the systemn to stablize to a non-vibration state after each exposure which includes moving the vertical slit aperture to its next position and advanceing the transparency film to the next sequential image. The laser is either de-energized or shuttered in an off position during the time the system is stablizing.

In addition computer generated sequential images that are rotated about a vertical axis must include an intermediate step of first being recorded sequentially onto transparent film.

SUMMARY OF THE INVENTION

The object of this invention is to provide a method of producing stereographic holograms using liquid crystal displays.

It also is an object of the present invention to eliminate vibration caused by sequentially stepping images.

Another object is to elimnate misalignment caused by improper registration of the sequentially stepped images.

Another object is to eliminate vibration caused by the movement of the vertical slit aperture.

Still another object is to eliminate misalignment of vertical strip holograms by the horizontally movable vertical slit aperture.

Still another object is too allow holographically recording of computer generated and video images without an intermediate transparency film producing step.

The foregoing objects can be accomplished by using a liquid crystal display in place of the transparency film, and another liquid crystal display in place of the vertical slit aperture.

BRIEF DISCRIPTION OF THE DRAWINGS

FIG. 1. is one schematic perspective sketch illustrating typical views of a subject with the subsequent images obtained by moving camera along horizonal axis.

FIG. 2. is a second schematic perspective sketch illustrating typical views of a subject with subsequent images obtained by rotating subject along vertical axis with stationary camera.

FIGS. 3a, 3b and 3c are diagrammatic sketches of images taken in the manner shown in FIG. 1 or FIG. 2. In addition these sketches illustrate views of computer generated images without need of any camera.

FIGS. 5a and 5b is a sketch of a portion of the apparatus of FIG. 4. On an enlarged scale, taken as seen essentially along lines 11—11 in FIG. 4.

DETAILED DESCRIPTION

FIGS. 1 and 2 depict the typical perspective views of a subject required for a successful stereographic hologram. It is possible to use a video camera to record these views and later playback frame by frame on the liquid crystal display to record holographically.

FIGS. 3a, 3b and 3c show typical images that will be generated on the liquid crystal display matrix and recorded holographically. These images can be either computer generated, digitized photographs or video recorded playbacks.

The number of images used will depend upon the method of obtaining these images and would be obvious to those skilled in the art. However the spacing between images should not be less than the pixel size of the liquid crystal displays used.

Figure 4:
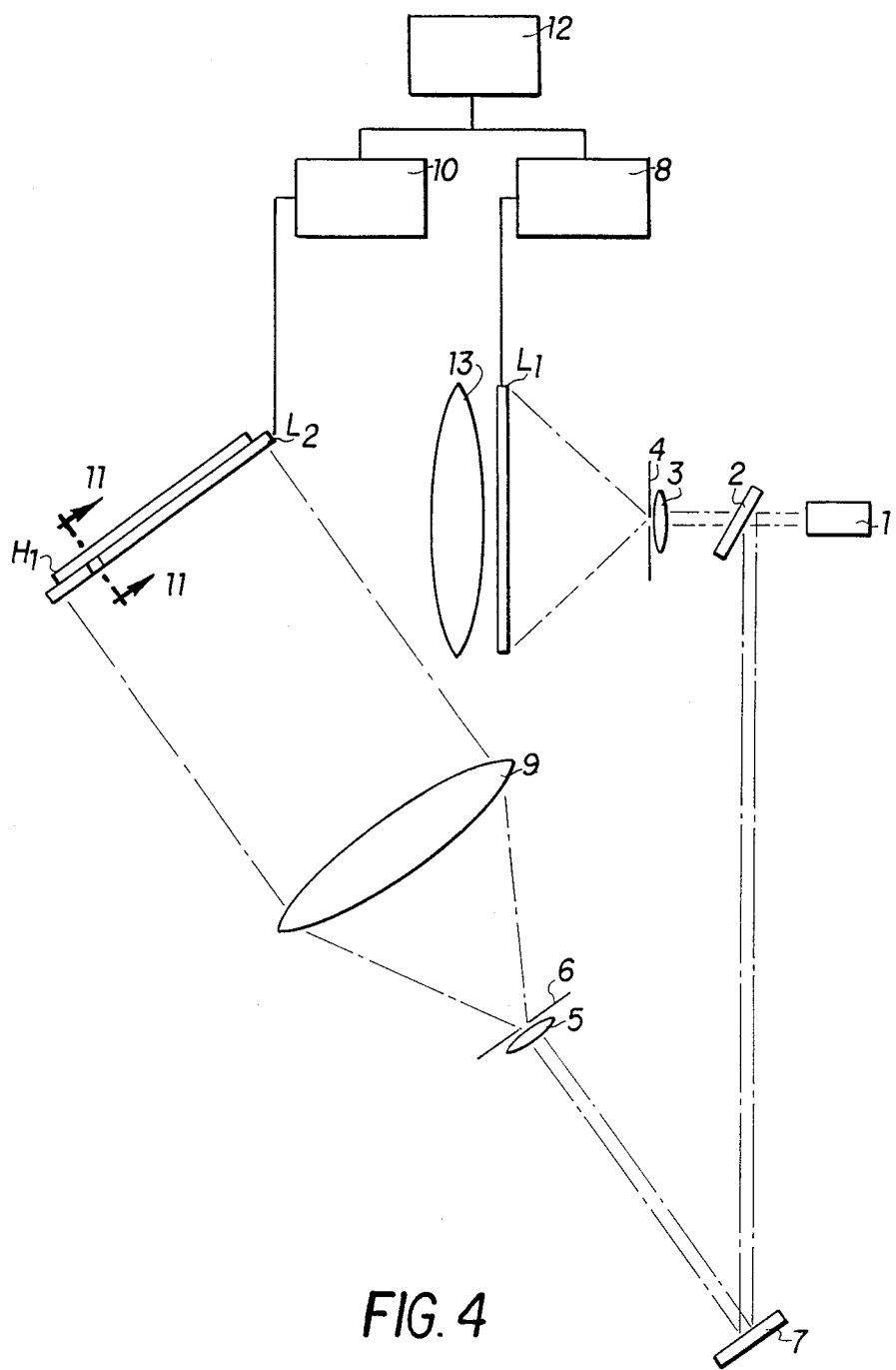
FIG. 4 is a schematic diagram illustrating the preparation of a hologram in accordance with the invention.
Figure 5A:
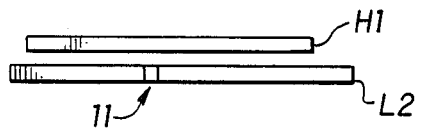
Figure 5A:
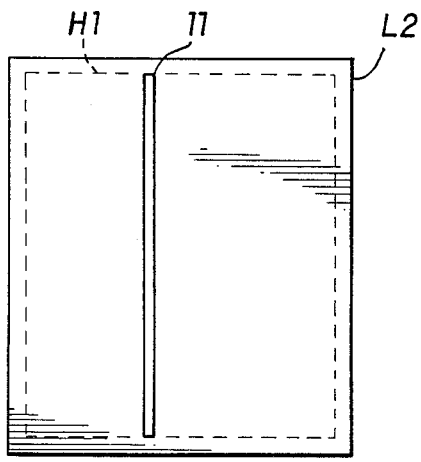
Figure 6:
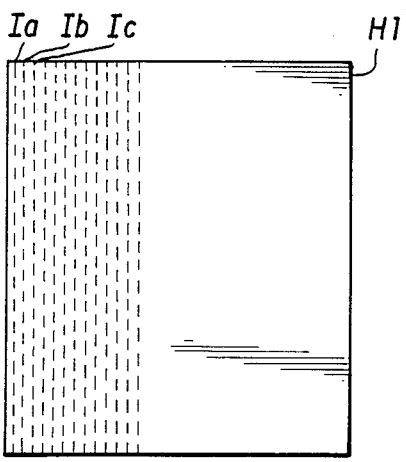
FIG. 6 is a diagrammatic sketch of the hologram prepared in accordance with the process of FIGS. 1-5 on an enlarged scale relative to FIG. 5, illustrating diagrammatically the location of various zones on the hologram.

Referring to FIGS. 4, 5 and 6. The strip hologram H1 is made with a coherent light source such as a laser 1. The exact wavelength of the laser isn't critical, but preferably to be around the center of the visible frequency spectrum.

A collimated beam from laser 1 is directed onto a beam splitter 2, the transmitted beam from which is focused onto a pinhole in mask 4 by lens 3, to form an essential point of light source. Light from this source is projected through the image on the liquid crystal display L1. The transmitted beam from L1 is brought to a focus by lens 13 onto plate H1. Control 8 is any electronic apparatus capable of generating an image on an liquid crystal displaay matrix L1. Typical controllers could be either a computer, generating images or a VCR that has a stabilized frame by frame advance.

A reference beam is reflected from the beam splitter 2 to mirror 7. The beam reflected from mirror 7 is focused onto a pinhole in mask 6 by lens 5. The reference beam from the aperture in mask 6 is collimated by lens 9.

The mask L2 is a liquid crystal display matrix and is connected to control 10. Control 10 is any electronic apparatus capable of generating a transparent vertical slit aperture 11 on the liquid crystal display as seen in FIG. 5 and moving the aperture horizontally and simultaneously in step with the sequential images generated on L1.

Control 12 is any electronic appartus that can generate a control signal to control 10 and control 8 to signal synchronized increments of aperture and images respectively after predetermined exposure time. Typically controller 12 would be part of controler 8 or controler 10. Operating in a master-slave mode.

The hologram H1 is made by generating the first image, such as 3a, onto the liquid crystal display L1, with the photographic plate position behind liquid crystal display L2 and a transparent aperture generated on L2, labeled 11 placed to the left of the position as seen in FIG. 5 such that the left edge of the photograph plate is exposed through aperture 11 to record a holographic image Ia as indicated in FIG. 6. When controler 12 generates a control signal to controlers 8 and 10. The controler 8 electronical increments the image on L1 to the next sequential image, such as 3b, while controller 10 simultaneously moves the aperture 11 on L2 right to the next position to expose the region on which the next image Ib is recorded. This process is continued until adjacent latent strip holograhic images of all images have been recorded. The photographic plate is then processed in a conventional manner, preferably by developing, fixing and bleaching to form the final image.

Having thus described the invention what I claim is:

1. A method of constructing a multiplex hologram of two dimensional images displayed on an LCD display, comprising: generating a series of two-dimensional images; displaying successive ones of said images on an LCD display matrix;

providing a holographic plate to be exposed;

directing an object beam of coherent radiation at the LCD display matrix so that the transmitted coherent radiation is incident on the holographic plate;

directing a reference beam of coherent radiation at the holographic plate to produce, in combination with the transmitted object beam, a holographic interference pattern on the plate; and selectively exposing portions of the plate, through slit apertures in a second LCD display matrix, said portions corresponding to successive ones of the images to form a multiplex hologram on the plate.

* * * * *